(12) United States Patent
Phillipsen et al.

(10) Patent No.: US 6,565,324 B1
(45) Date of Patent: May 20, 2003

(54) TURBINE BLADE WITH BRACKET IN TIP REGION

(75) Inventors: Bent Phillipsen, Baden-Rütihof (CH); Boris Mamaev, Moscow (RU); Evgeny Ryabov, Samara (RU)

(73) Assignee: ABB Turbo Systems AG, Baden (CH)

( * ) Notice: Subject to any disclaimer, the term of this patent is extended or adjusted under 35 U.S.C. 154(b) by 0 days.

(21) Appl. No.: 09/937,321

(22) PCT Filed: Mar. 23, 2000

(86) PCT No.: PCT/CH00/00172
§ 371 (c)(1),
(2), (4) Date: Jan. 29, 2002

(87) PCT Pub. No.: WO00/57029
PCT Pub. Date: Sep. 28, 2000

(30) Foreign Application Priority Data

Mar. 24, 1999 (DE) .......................................... 199 13 269

(51) Int. Cl.[7] ................................................. F01D 5/14
(52) U.S. Cl. .................... 416/236 R; 416/228; 415/191
(58) Field of Search ................................. 416/228, 235, 416/236 R, 236 A, 237, 189, 191, 192, 193 R; 415/191, 208.1, 208.2, 210.1

(56) References Cited

U.S. PATENT DOCUMENTS

| 3,706,512 A | * | 12/1972 | Strelshik | 416/236 R |
| 4,108,573 A | * | 8/1978 | Wagner | 416/236 A |
| 5,137,426 A | * | 8/1992 | Rhoda | 416/191 |
| 5,151,014 A | * | 9/1992 | Greenwald et al. | 416/237 |
| 5,282,721 A | * | 2/1994 | Kildea | 416/228 |
| 6,318,961 B1 | * | 11/2001 | Phillipsen | 416/235 |

FOREIGN PATENT DOCUMENTS

| AU | 216224 A | * 7/1957 | ................. 416/235 |
| DE | 560589 | 10/1932 | |
| DE | 2405050 | 8/1975 | |
| GB | 2050530 A | 1/1981 | |
| GB | 2153447 A | 8/1985 | |

OTHER PUBLICATIONS

"Aerodynamic Design of First Stage Turbines for Small Aero Engines", U. OKAPUU, Pratt & Whitney, Canada, von Karman Institute for Fluid Dynamics Lecture Series Jul. 1987, Small High Pressure Ratio Turbines Jun. 15–18, 1987.

* cited by examiner

*Primary Examiner*—Christopher Verdier
(74) *Attorney, Agent, or Firm*—Burns, Doane, Swecker & Mathis, L.L.P.

(57) ABSTRACT

A turbine blade is provided with a bracket arranged in the tip region of the blade and projecting beyond the blade profile. The bracket is formed merely in a section of a surface region of the pressure side, the surface region being enclosed by an imaginary chord bearing against the pressure side of the blade body both in the region of the leading edge and in the region of the trailing edge.

4 Claims, 1 Drawing Sheet

Fig. 1
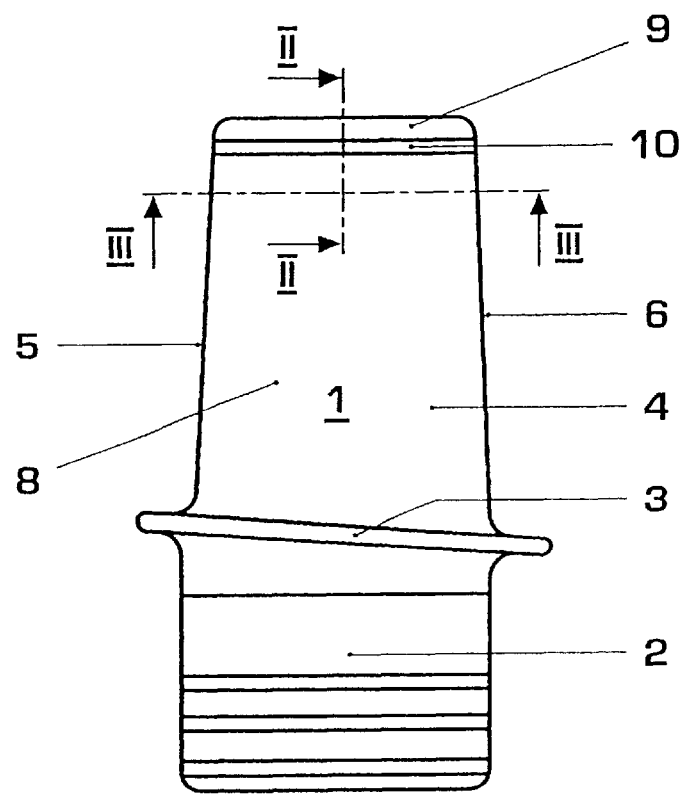
Fig. 2
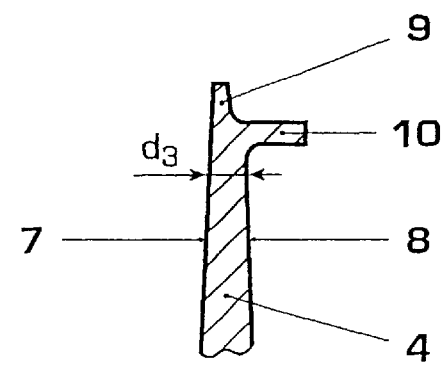
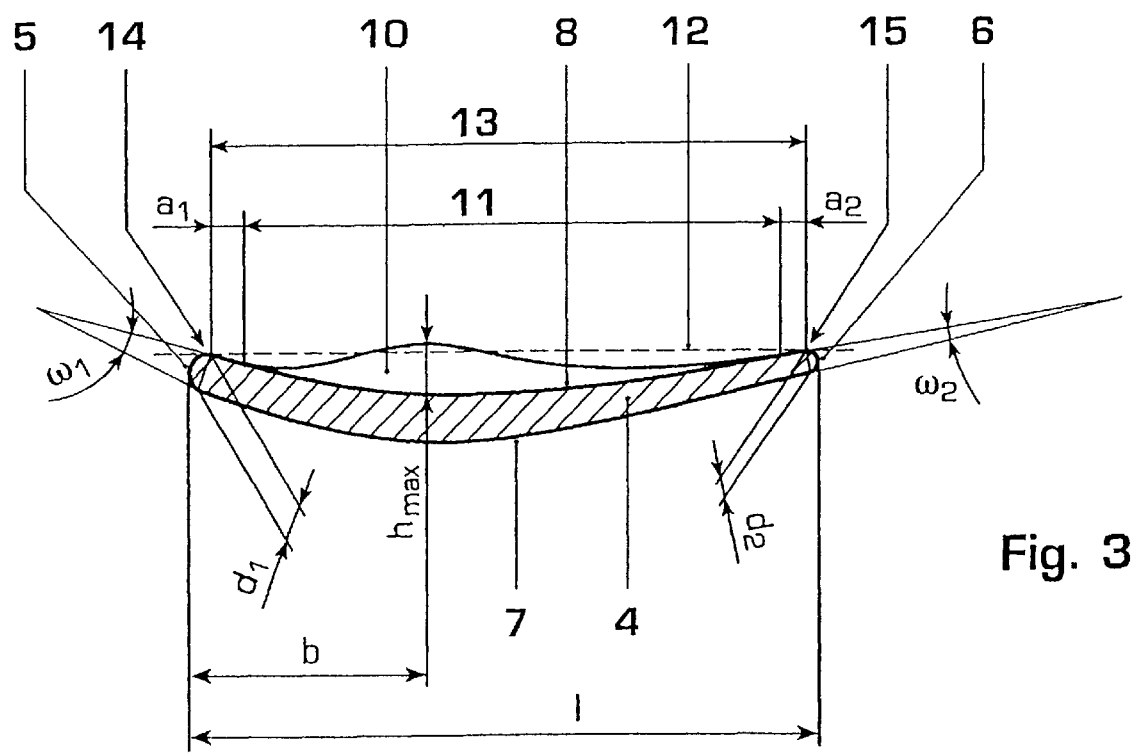
Fig. 3

US 6,565,324 B1

TURBINE BLADE WITH BRACKET IN TIP REGION

FIELD OF THE INVENTION

The invention relates to a turbine blade having a bracket arranged in the tip region of the blade and projecting beyond the blade profile.

BACKGROUND OF THE INVENTION

In particular in smaller turbomachines, the gap losses occurring in the tip region of the turbine blades, i.e. between the blade tip and the blade shroud, may assume considerable proportions and thus may lead to a distinct loss of efficiency. These gap losses are caused by the pressure difference between the pressure side and the suction side in the tip region of the blade, as a result of which there is an overflow of the working fluid. This overflow can be reduced by increasing the friction losses between the blade tip and the blade shroud, a factor which leads to a reduction in the gap losses and thus to an increase in the efficiency.

A known measure aimed at reducing the gap losses and increasing the reliability of the turbine blade is the arrangement of a rib or bracket (so-called minishroud or winglet) projecting laterally beyond the blade profile in the tip region of the blade (Ü. Okapuu, presentation "Aerodynamic design of first stage turbines for small aero engines", held as part of the lecture series 1987–07 of the Karman Institute for Fluid Dynamics, on the topic "Small High Pressure Ratio Turbines", Jun. 15–18, 1987, pages 1–4 and FIGS. 1–4). GB-A-2 153 447 and GB-A-2 050 530 also disclose blade bodies having brackets projecting onto the suction side and onto the pressure side. GB-A-2 050 530 also indicates a blade body having a bracket which is arranged on the suction side and above which the blade body rises on all sides.

However, all these solutions result in an increase in both the leading and trailing wedge angles of the blade and thus in corresponding efficiency losses.

SUMMARY OF THE INVENTION

The object of the invention, in attempting to avoid all these disadvantages, is to achieve a further improvement in efficiency for a turbine blade which is provided with a bracket arranged in the tip region of the blade and projecting beyond the blade profile.

According to the invention, this is achieved in that, the bracket is formed on the pressure side of the blade and only in a section of a defined surface region of this pressure side. In this case, this defined surface region constitutes that region of the pressure side which is enclosed by an imaginary chord bearing against the pressure side of the blade body both in the region of the leading edge and in the region of the trailing edge.

The pressure-side section having the bracket is formed between and at a distance from two points lying on the pressure side of the blade body, the first point being arranged in the region of the leading edge and the second point being arranged in the region of the trailing edge, and the imaginary chord bearing against both points. It has proved to be especially expedient to form a distance $a_1$, $a_2$ between the first point and the bracket and between the second point and the bracket, and this distance $a_1$, $a_2$ in each case corresponds approximately to a blade thickness $d_1$, $d_2$ in the corresponding region of the blade body.

Since the bracket therefore extends only over part of the pressure side, both wedge angles of the blade body, i.e. the leading angle and the trailing angle, can be kept small. The wedge angles can be reduced further through selection of the defined distances $a_1$, $a_2$. This results in an acute blade geometry, which ensures that high Mach numbers in the leading-edge region and wake zones in the trailing-edge region of the blade body are avoided. Ultimately, a further improvement in efficiency is achieved while a reduction in the gap losses continues to be ensured.

Starting from the leading edge, the bracket has a maximum height $h_{max}$ above the pressure side in a region of 30 to 40% of the chord length l of the blade body. In this case, the height of the bracket continuously decreases both in the direction of the leading edge and in the direction of the trailing edge of the blade body. The maximum height $h_{max}$ of the bracket corresponds approximately to a blade thickness $d_3$ as formed in a region of the blade body which is adjacent to the bracket and remote from the blade tip. Furthermore, it is advantageous if the bracket is of wavelike design.

It has been found that, in particular with such a design of the bracket, optimum flow guidance can be achieved.

BRIEF DESCRIPTION OF THE DRAWING

An exemplary embodiment of the invention is shown in the drawing with reference to a moving blade of the exhaust-gas turbine of a turbocharger. In the drawing:

FIG. 1 shows a pressure-side side view of the moving blade;

FIG. 2 shows a section through the moving blade along line II—II in FIG. 1;

FIG. 3 shows a section through the moving blade along line III—III in FIG. 1.

Only the elements essential for the understanding of the invention are shown. Elements not shown are, for example, the other components of the exhaust-gas turbine, including the blade shroud.

DETAILED DESCRIPTION OF THE INVENTION

The turbine blade shown in FIG. 1 and designed as a moving blade 1 consists of a blade root 2, a platform 3 and a blade body 4. The platforms of adjacent turbine blades of the turbine wheel (not shown) bear directly against one another and thus form the inner boundary of the flow duct, which is closed on the outside by a blade shroud (likewise not shown). The blade body 4 has a leading edge 5, a trailing edge 6, a suction side 7, a pressure side 8 and a blade tip 9 (FIG. 2).

In the region of the blade tip 9, a bracket 10 is arranged on the pressure side 8 of the blade body 4, this bracket 10 extending only over a section 11 of the entire pressure side 8. This section 11 is an integral part of a surface region 13, enclosed by an imaginary chord 12, of the pressure side 8. To this end, the chord 12 bears against a first point 14 in the region of the leading edge 5 of the blade body 4 and against a second point 15 in the region of the trailing edge 6 of the blade body 4. The section accommodating the bracket 10 is formed between and at a distance from the two points 14, 15. It is therefore smaller than the surface region 13 enclosed by the chord 12 (FIG. 3).

Formed between the first point 14 and the bracket 10 is a distance $a_1$ which corresponds approximately to the blade thickness $d_1$ in this region of the blade body 4. Likewise, a distance $a_2$ is formed between the second point 15 and the bracket 10, and this distance $a_2$ in turn corresponds approximately to the blade thickness $d_2$ in this region of the blade body 4.

The bracket 10 has a maximum height $h_{max}$ above the pressure side 8, which corresponds approximately to a blade thickness $d_3$ which is formed in a region of the blade body 4 which is adjacent to the bracket 10 but remote from the blade tip 9 (FIG. 2). The maximum height $h_{max}$ is arranged at a distance b from the leading edge 5, this distance b lying at 30 to 40% of the chord length l of the blade body 4 (FIG. 3). Starting from the maximum height $h_{max}$, the height of the bracket 10 decreases continuously both in the direction of the leading edge 5 and in the direction of the trailing edge 6 of the blade body 4. In this case, the height of the bracket 10 is reduced in both directions in such a way that a wavelike outer contour is obtained over the chord length l.

Since the bracket 10 is formed only in a section 11 of the pressure side 8 and is offset to the inside relative to the bearing points of the chord 12 on the pressure side 8, and since its height continuously decreases in the direction of both blade edges, both wedge angles of the turbine blade 1, i.e. both the leading angle $\omega_1$ and the trailing angle $\omega_2$ can be kept small compared with the solutions disclosed by the prior art.

In operation, this acute blade geometry improves the incident flow in the region of the leading edge 5 of the blade body 4 and thus reduces the Mach numbers. Likewise on account of the acute blade geometry, the generation of wake zones is prevented in the region of the trailing edge 6 of the blade body 4. In this way, a further improvement in efficiency can be achieved, the requisite reduction in the gap losses still being ensured. In addition, optimum flow guidance can be achieved by the wavelike outer contour of the bracket 10.

In addition to the bracket 10 on the pressure side 8 of the blade body 4, a bracket (not shown) may also be arranged on the suction side 7, as a result of which the risk of overflow is further reduced and, given an appropriate design, the flow guidance can also be improved in this region. Of course, such a bracket 10 may be used not only in moving blades but also in guide blades.

LIST OF DESIGNATIONS

1 Turbine blade, moving blade
2 Blade root
3 Platform
4 Blade body
5 Leading edge
6 Trailing edge
7 Suction side
8 Pressure side
9 Blade tip
10 Bracket
11 Section
12 Chord
13 Surface region
14 Point, first
15 Point, second
$a_1$ Distance
$a_2$ Distance
b Distance
$d_1$ Blade thickness of 4
$d_2$ Blade thickness of 4
$d_3$ Blade thickness of 4
$h_{max}$ Maximum height of 10
l Chord length of 4
$\omega_1$ Leading angle of 4
$\omega_2$ Trailing angle of 4

What is claimed is:

1. A turbine blade having a blade body which is provided with a leading edge, a trailing edge, a suction side and a pressure side and which has a blade tip, a bracket being arranged on the pressure side of the blade body in the region of the blade tip, wherein the bracket is formed merely in a section of a surface region of the pressure side, the surface region being enclosed by an imaginary chord bearing against a first point of the pressure side of the blade body in the region of the leading edge and against a second point of the pressure side of the blade body in the region of the trailing edge, the section accommodating the bracket being formed between and at a distance from the two points, wherein a distance is formed between the first point and the bracket and between the second point and the bracket, and this distance corresponds approximately to a blade thickness in the corresponding region of the blade body.

2. The turbine blade as claimed in claim 1, wherein the bracket, starting from the leading edge, has a maximum height above the pressure side located in a region of 30 to 40% of the chord length of the blade body, the height of the bracket continuously decreasing both in the direction of the leading edge of the blade body and in the direction of the trailing edge of the blade body.

3. The turbine blade as claimed in claim 1, wherein the bracket is of wavelike design.

4. A turbine blade having a blade body which is provided with a leading edge, a trailing edge, a suction side and a pressure side and which has a blade tip, a bracket being arranged on the pressure side of the blade body in the region of the blade tip, wherein the bracket is formed merely in a section of a surface region of the pressure side, the surface region being enclosed by an imaginary chord bearing against a first point of the pressure side of the blade body in the region of the leading edge and against a second point of the pressure side of the blade body in the region of the trailing edge, the section accommodating the bracket being formed between and at a distance from the two points, wherein the bracket, starting from the leading edge, has a maximum height above the pressure side located in a region of 30 to 40% of the chord length of the blade body, the height of the bracket continuously decreasing both in the direction of the leading edge of the blade body and in the direction of the trailing edge of the blade body.

* * * * *